United States Patent [19]

Parigger

[11] Patent Number: 5,074,831
[45] Date of Patent: Dec. 24, 1991

[54] LIMITED-SLIP DIFFERENTIAL WITH MESHING PAIRS OF WORMS

[75] Inventor: Martin Parigger, Eggersdorf, Austria

[73] Assignee: Steyr-Daimler-Puch AG, Vienna, Austria

[21] Appl. No.: 336,898

[22] Filed: Apr. 12, 1989

[30] Foreign Application Priority Data

May 3, 1988 [AT] Austria ................................ 1137/88

[51] Int. Cl.⁵ .......................... F16H 1/38; F16H 1/45; F16H 55/02
[52] U.S. Cl. ...................................... 475/226; 74/416; 74/424.5
[58] Field of Search .............. 475/226, 227, 228, 229; 74/416, 417, 425, 427, 424.5

[56] References Cited

U.S. PATENT DOCUMENTS

| | | | |
|---|---|---|---|
| 1,164,770 | 12/1915 | Walter | 475/226 |
| 1,196,988 | 9/1916 | Schurlock | 475/226 |
| 1,252,388 | 1/1918 | Bickley | 475/226 X |
| 1,268,429 | 6/1918 | Brown | 475/226 |
| 1,294,040 | 2/1919 | Brown | 475/227 |
| 1,373,657 | 4/1921 | Finefrock | 475/227 |
| 1,407,703 | 2/1922 | Moir | 475/226 X |
| 2,203,683 | 6/1940 | Frederickson | 475/226 |
| 2,559,916 | 7/1951 | Gleasman | 475/227 |
| 2,631,475 | 3/1953 | Gleasman | 475/227 |
| 2,973,660 | 3/1961 | Popper | 74/424.5 |
| 3,343,426 | 9/1967 | Popper | 74/424.5 |
| 3,955,442 | 5/1976 | Kessmar | 475/227 X |
| 4,147,072 | 4/1979 | Mullens | 74/416 |
| 4,478,103 | 10/1984 | Benjamin | 74/424.5 X |

FOREIGN PATENT DOCUMENTS

| | | |
|---|---|---|
| 0148641 | 7/1985 | European Pat. Off. |
| 0130806 | 6/1987 | European Pat. Off. |
| 8403747 | 9/1984 | PCT Int'l Appl. |

Primary Examiner—Allan D. Herrmann
Assistant Examiner—Khoi Q. Ta
Attorney, Agent, or Firm—Marmorek, Guttman & Rubenstein

[57] ABSTRACT

A limited-slip differential gear comprising a differential gear case which is adapted to be driven and in which two coaxial side gears and at least one pair of differential pinions cooperating with each other and associated with the side gears are rotatably mounted, wherein each differential pinion and the associated side gear constitute a worm gear train. In order to reduce the manufacturing costs and the overall size, the worm gear trains comprise worm gears consisting of the side gears and worms consisting of the differential pinions and the differential pinions of each pair have axes extending at an angle to each other and directly mesh with each other.

8 Claims, 5 Drawing Sheets

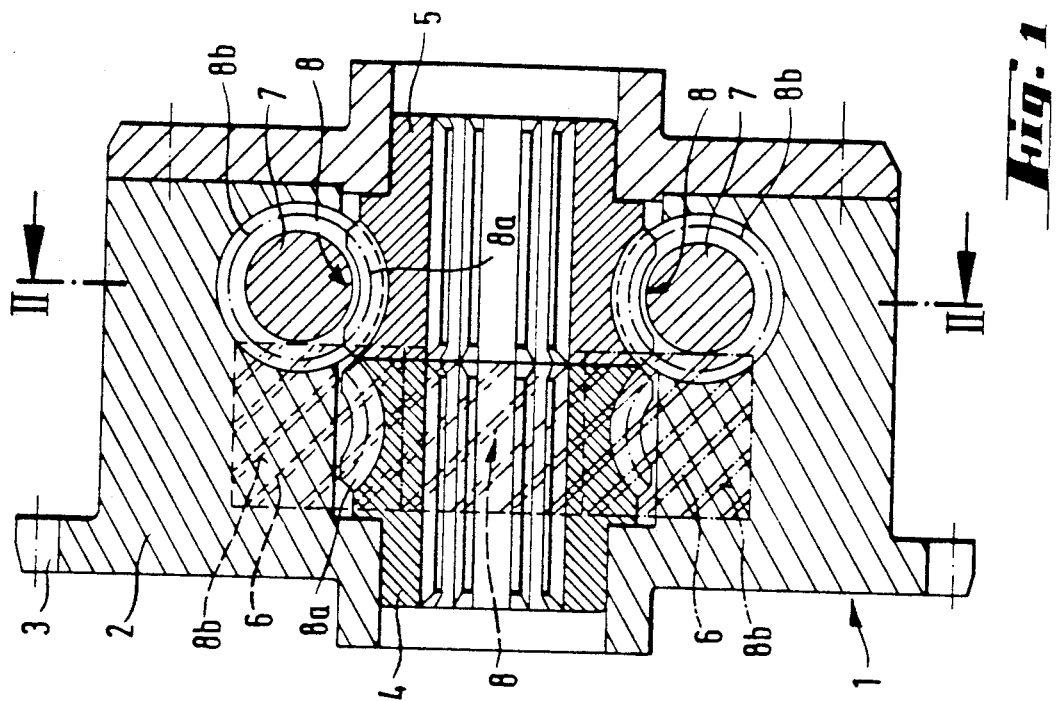
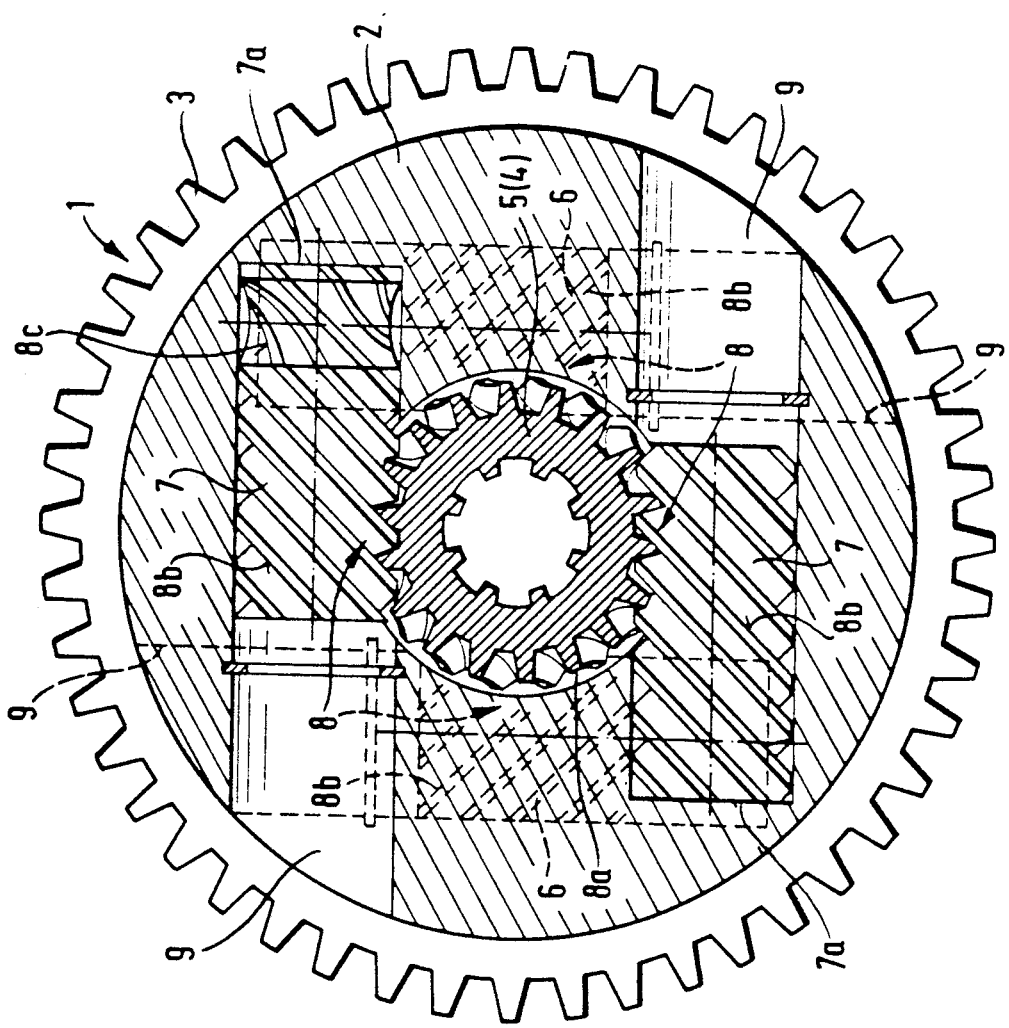

LIMITED-SLIP DIFFERENTIAL WITH MESHING PAIRS OF WORMS

BACKGROUND OF THE INVENTION

1. Field of the Invention

This invention relates to a limited-slip differential gear comprising a differential gear case which is adapted to be driven and in which two coaxial side gears and at least one pair of differential pinions cooperating with each other and associated with the side gears are rotatably mounted, wherein each differential pinion and the associated side gear constitute a worm gear train.

2. Description of the Prior Art

Such a limited-slip differential gear has a low efficiency because the friction has intentionally been increased so that a restraining action which depends on the driving torque will be effected unless the parts for performing the differential function and those for performing the locking function are structurally separated. Such a Torsen differential gear is a limited-slip differential gear in which the desired internal friction is produced by the side gears and differential pinions. Such Torsen differential gears have proved highly satisfactory because they are robust and can take up high loads. But as is apparent from EP-A-139 679 (WO 84/03747) the worms were used as side gears and the worm gears were used as differential pinions in said differential gears and the worm gears were constituted by pairs of parallel pinions and were operatively coupled by meshing spur gears. This means that a large number of gears were provided, which added to the manufacturing costs and to the bulk of the limited-slip differential.

EP-A2 148 641 discloses limited-slip differential gears which comprise cooperating parallel worms for performing a differential action between the side gears, which have helical teeth. Each pair of diametrically opposite ones of said worms cooperate with each other via a worm gear. That design also involves a high structural expenditure and the provision of worm gears disposed between the side gears and the fact that the differential pinions and side gears have parallel axes result in a particularly large space requirement. Similar remarks are applicable to the limited-slip differential gear which is disclosed in EP-B1 130 806 and comprises helical side gears and differential pinions meshing with each other. The differential pinions consisted of planet pinions, which were regularly distributed around the periphery and in mesh with the sun gears, which constituted the side gears. Said pinions were in mesh with each other in alternation. Owing to the provision of a large number of gears and pinions and the facts that the differential pinions and side gears had parallel axes and the sun gears were separated from each other by an internally arranged device for applying pressure, that differential gear was expensive and bulky.

SUMMARY OF THE INVENTION

It is an object of the invention to eliminate the disadvantages set forth and to provide a limited-slip differential gear which is of the kind described first hereinbefore and which involves a relatively low structural expenditure and relatively low manufacturing costs and which can be designed to constitute a small, compact unit.

That object is accomplished in accordance with the invention in that the worm gear trains comprise worm gears consisting of the side gears and worms consisting of the differential pinions and the differential pinions of each pair have axes extending at an angle to each other and directly mesh with each other. Because the differential pinions consist of worms, the associated differential pinions of each pair thereof cooperate with each other without interposed idler gears so that fewer gears are required and the structural expenditure and manufacturing costs are greatly reduced. Besides, the direct meshing of the worm gears which constitute the side gears with the associated worms having axes extending in a plane that is normal to the axes of the side gears will permit the differential gear to be designed for a particularly short overall axial length so that an economical, functionally reliable, robust and compact limited-slip differential gear is obtained.

Whereas the worm screw threads of the differential pinions of each pair thereof may directly mesh with each other it is also possible within the scope of the invention to provide one differential pinion of each pair thereof with an end portion which is provided with worm gear teeth meshing with the worm screw threads of the other differential pinion of the same pair so that the torque which can be transmitted will be increased by the cooperation of worm gear teeth and worm screw threads.

At least two pairs of differential pinions will be provided to improve the strength and dynamic balance and will be symmetrically distributed about the axis of the side gears. In the simplest arrangement, two diametrically opposite pairs of differential pinions are provided. In another suitable arrangement, three pairs of differential pinions are associated with the side gears and each side gear is floatingly mounted between the three differential pinions associated therewith so that the expenditure and the overall size will further be reduced. Owing to the provision of three pairs of differential pinions, three differential pinions which are spaced 60 degrees apart from the adjacent differential pinions are associated with each side gear. As each side gear is disposed between the associated differential pinions there is no need for separate bearings for the side gears.

According to a desirable feature of the invention the differential pinions are rotatably mounted in the differential case at one end and/or the other by needle roller bearings so that the friction conditions and the restraining actions which can be achieved can effectively be controlled in spite of the confined space. If the needle roller bearings are provided only at one end, different restraining actions in dependence on the sense of rotation may be achieved.

BRIEF DESCRIPTION OF THE DRAWING

FIG. 1 is an axial sectional view showing a limited-slip differential gear which embodies the invention.

FIG. 2 is a transverse sectional view taken on line II—II in FIG. 1.

DETAILED DESCRIPTION OF THE PREFERRED EMBODIMENTS

Figure 1A:
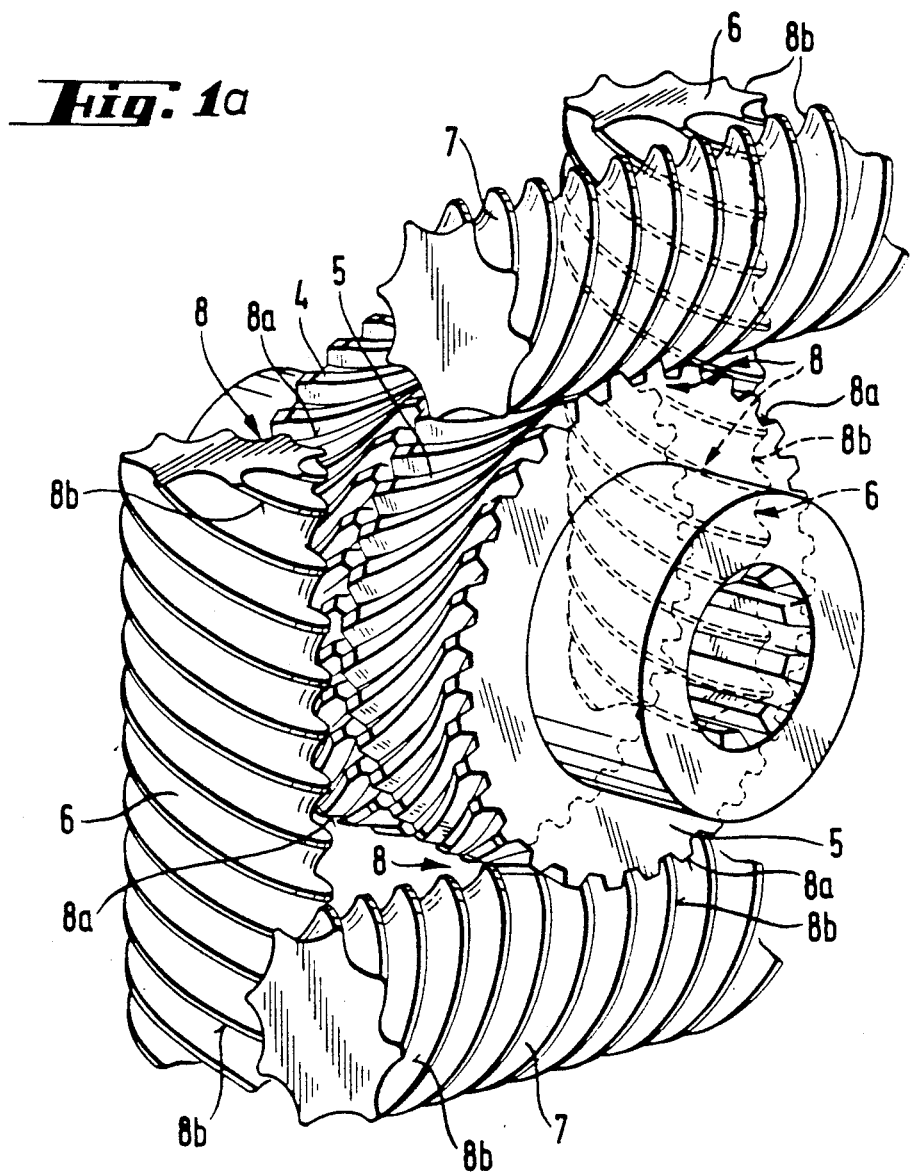
FIG. 1a is a perspective view showing how the gears mesh together in the limited-slip differential gear of the present invention.

Illustrative embodiments of the invention will now be described more in detail with reference to the diagrammatic drawing.

The differential gear 1 comprises a differential case 2, which is adapted to be driven via an external gear 3. Two coaxial side gears 4, 5 are rotatably mounted in the case 2 and are adapted to drive stub axles, not shown, of a driven axle of a vehicle or the like with torques which have been derived from an input torque by the differential gear 1. Two pairs of differential pinions 6, 7 are associated with the side gears 4, 5 and are also freely rotatably mounted in the case 2 and are not only in mesh with the associated side gears 4, 5 but the differential pinions 6, 7 constitute worm gear trains 8, in which the worm gear teeth 8a are provided on the side gears 4, 5 and the worm screw threads 8b are provided on the differential pinions 6, 7. The differential pinions 6, 7 of each pair thereof are angular offset by 90 degrees from each other and from the associated side gears 4, 5. The differential pinions 6, 7 of each pair directly mesh with each other and with the associated side gears 4, 5. The arrangement is highly compact and the provision of only a few gears and of simple bearings for such gears, which bearings substantially consist of bores 9 in the case 2, ensure that the limited-slip differential 1 can economically be manufactured at low cost.

As is indicated by dotted lines in FIG. 2 the torque which can be transmitted by the cooperating differential pinions 6, 7 of each pair can be increased in that one differential pinion 7 of each pair of differential pinions 6, 7 has an end portion 7a, which carries worm gear teeth 8c meshing with the worm screw threads 8b of the other differential pinion 6 of the same pair. The cooperation of the worm gear teeth 8c with the corresponding portion of the worm screw threads 8b will improve the transmission of torque between the differential pinions 6, 7 of each pair.

Figure 3:
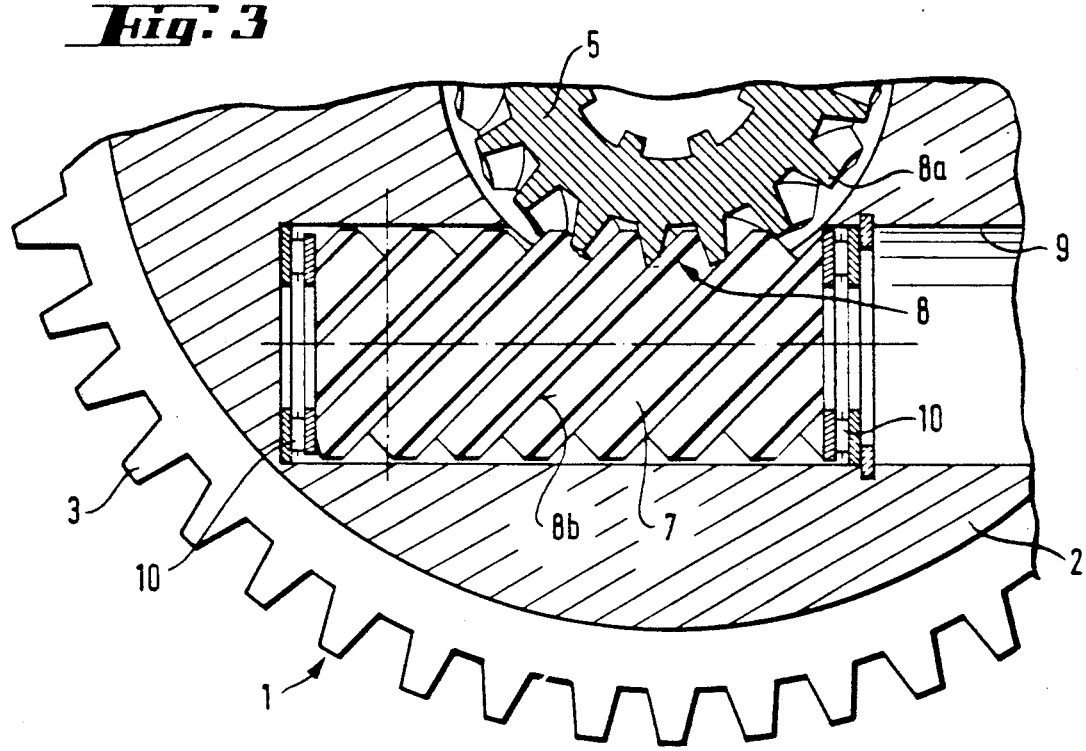
FIGS. 3 and 4 show illustrative embodiments of the bearings for the differential pinions of the differential gear on a larger scale.
Figure 4:
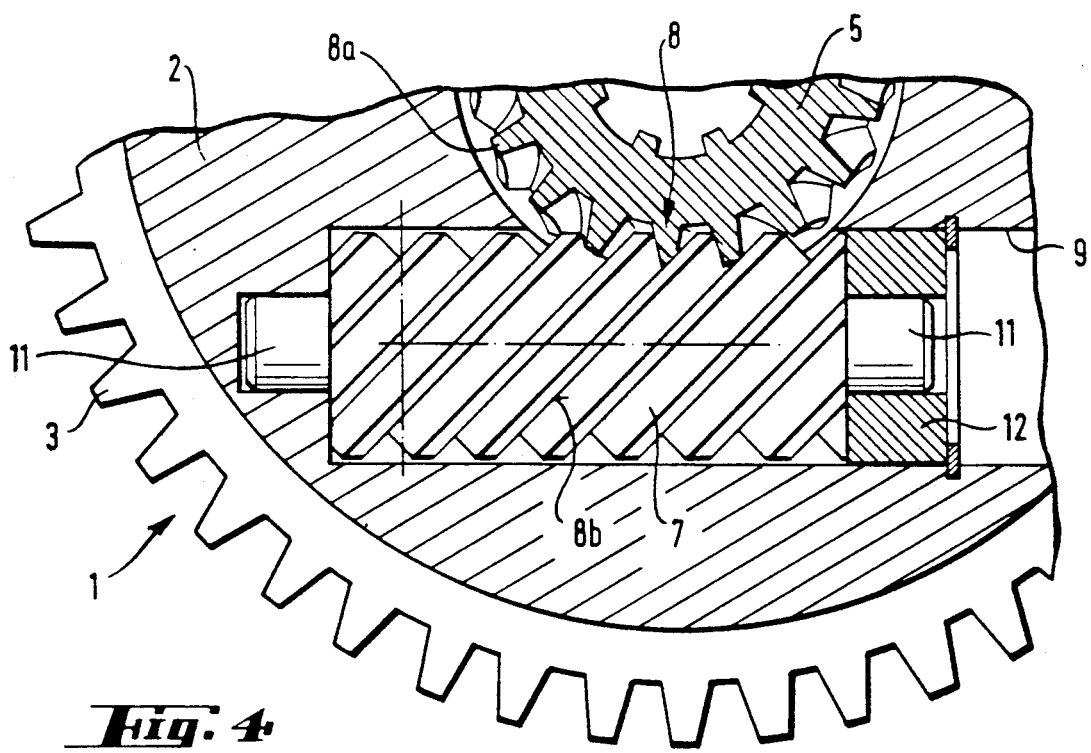

The limited-slip differential 1 in accordance with the invention is compact and can be manufactured at low cost. Owing to the internal mechanical friction exhibited by the worm gear trains 8 the restraining action of the differential gear 1 is torque-controlled. To permit a change of said friction and of the self-restraining action, the shapes of the teeth of the worm gear trains and particularly the bearings of the gears thereof may suitably be selected. For instance, the differential pinions 6, 7 may directly be mounted in housing bores 9 so that a strong restraining action will be effected. Alternatively, as is indicated in FIG. 3, the differential pinions 6, 7 may be rotatably mounted in the ends of the differential case 2 by axial needle roller bearings 10 in order to reduce the restraining action. In the illustrative embodiment shown in FIG. 4 the differential pinions 6, 7 are provided with end pins 11, which are rotatably mounted with or without bearing bushing 12. The mounting pins may be combined with needle roller bearings in a manner which is not shown. If different bearings are provided at opposite ends of the differential pinions, the restraining action will depend on the sense of rotation so that the limited-slip differential can be used for very specific purposes.

Figure 5:
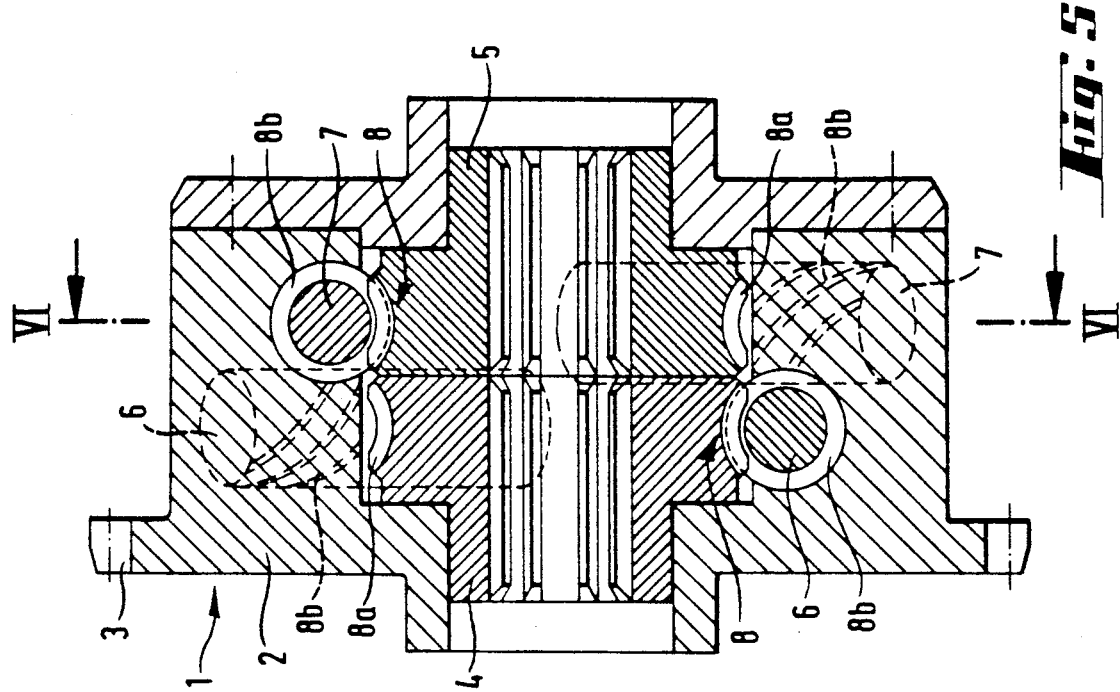
FIGS. 5 and 6 show an embodiment of the invention having three pairs of differential pinions associated with the side gears.
Figure 6:
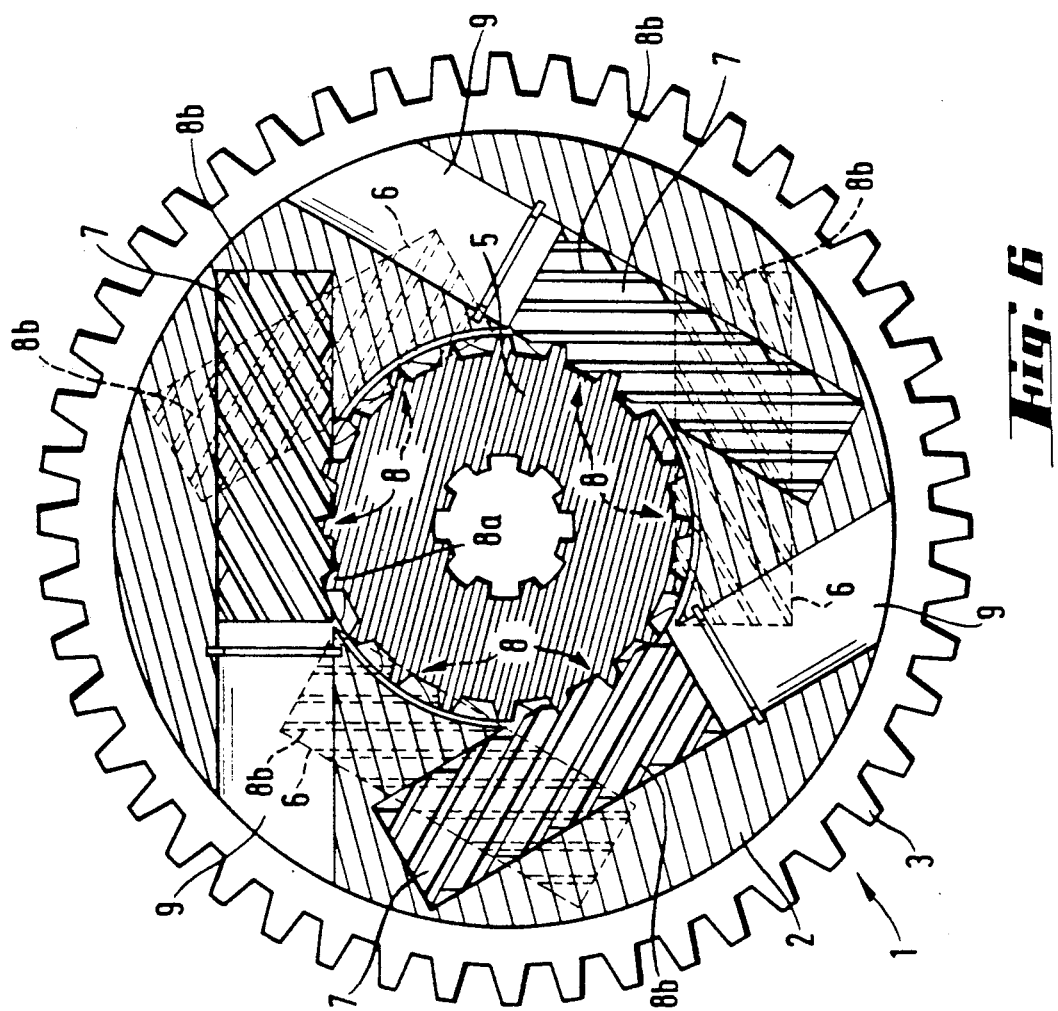
Figure 7:
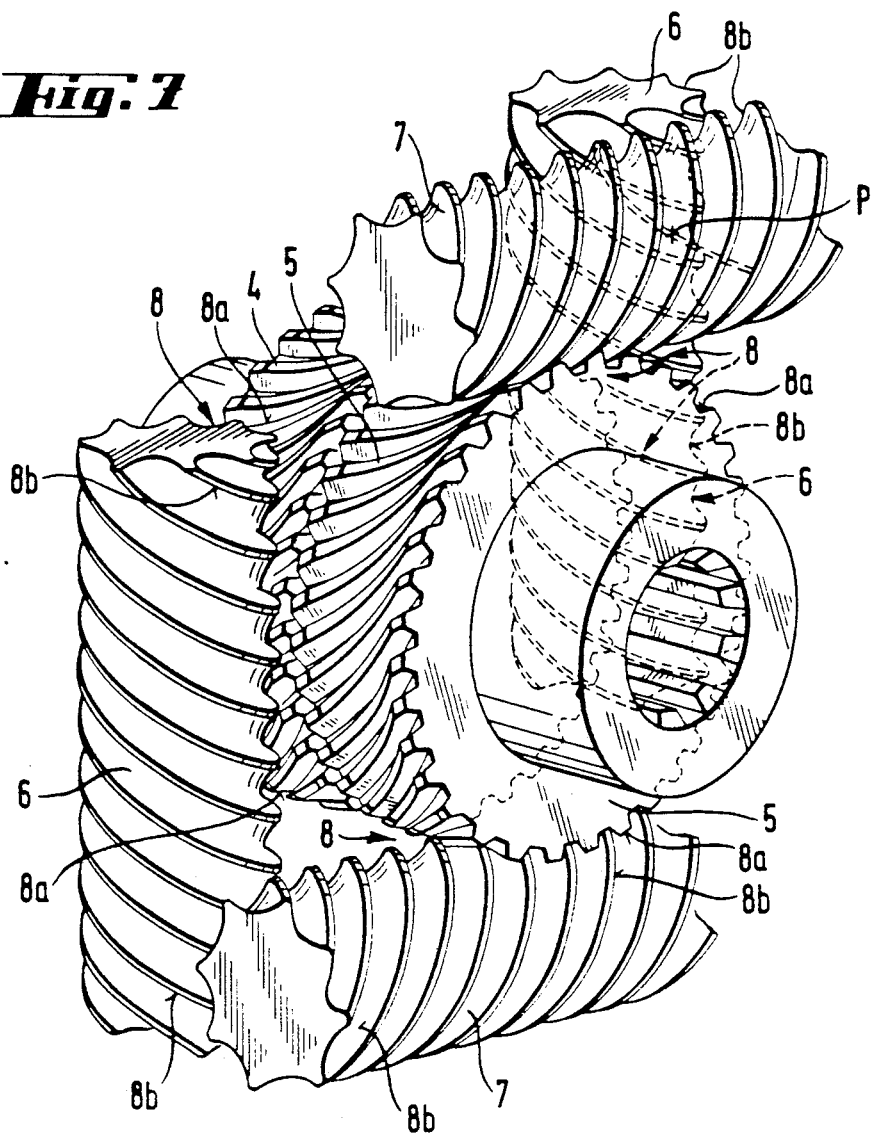
FIG. 7 is a further development of the perspective view shown in FIG. 1A and including an engagement point P.
Figure 7A:
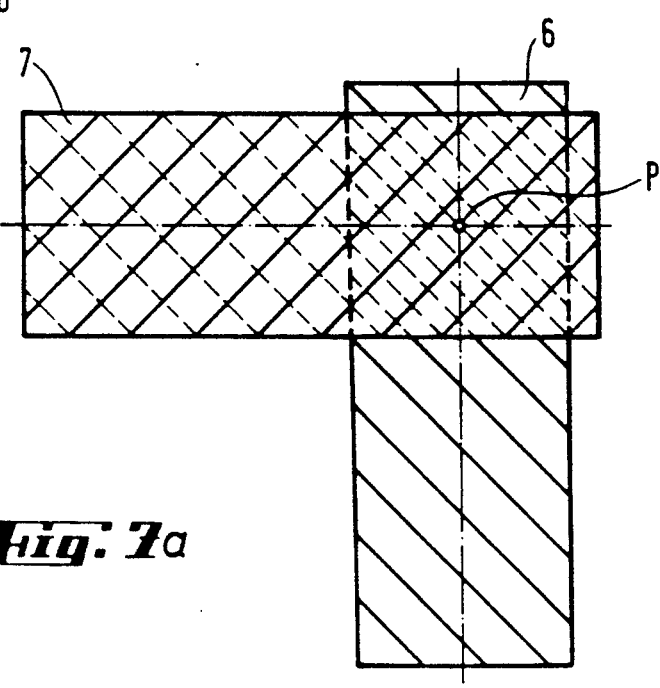
FIG. 7A is an orthogonal projection showing the engagement point P of FIG. 7.

FIGS. 5 and 6 illustrate an embodiment wherein three pairs of differential pinions 6:7 are associated with the side gears 4:5. Each of the differential pinions 6:7 in this embodiment is spaced an equal distance from the adjacent differential pinions associated with each side gear. As each side gear 4:5 is disposed between and meshes with its associated differential pinions, there is no need for separate bearings for the side gears and each is floatingly mounted on its associated differential pinions.

I claim:

1. A limited-slip differential comprising
a differential case, which is adapted to be driven,
two coaxial side gears rotatably mounted in said case,
at least one pair of differential pinions, which pinions cooperate with each other and are associated with respective ones of said side gears,
each of said differential pinions and its associated side gear constituting a worm gear train,
each of said side gears having worm gear teeth thereon and constituting a worm gear of said worm gear train,
each of said differential pinions having worm screw threads of the same rotational sense thereon and constituting a worm of said worm gear train,
the differential pinions of each of said pairs having axes extending at an angle to each other, and
said worm screw threads of the same rotational sense of each of said differential pinions directly meshing with said worm gear teeth of its associated side gear, and with said worm screw threads of said other differential pinion.

2. The limited-slip differential of claim 1, wherein
three of said pairs of differential pinions are associated with said side gears, and
each of said side gears directly meshes with and is supported by three differential pinions associated with it so that each said side gear is floatingly mounted on said three differential pinions associated therewith.

3. The limited-slip differential of claim 1, wherein each of said differential pinions is rotatably mounted by means of a needle roller bearing in said differential case at least at one end thereof.

4. The limited-slip differential of claim 1, wherein each of said differential pinions is rotatably mounted by means of a needle roller bearing in said differential case at each end thereof.

5. A limited-slip differential, comprising
a differential case, which is adapted to be driven,
two coaxial side gears rotatably mounted in said case,
at least one pair of differential pinions, which cooperate with each other and are associated with respective ones of said side gears,
each of said differential pinions and its associated side gear constituting a worm gear train,
each of said side gears having worm gear teeth thereon and constituting a worm gear of said worm gear train,
each of said differential pinions having worm screw threads of the same rotational sense thereon and constituting a worm of said worm gear train,
the differential pinions of each of said pairs having axes extending at an angle to each other, and said worm screw threads of each of said differential pinions directly meshing with said worm gear teeth of its associated side gear, and one differential pinions of each of said pair comprising an end portion provided with worm gear teeth meshing with said worm screw threads of the other differential pinions of said pair.

6. The limited-slip differential of claim 5, wherein three of said pairs of differential pinions are associated with said side gears, and each of said side gears directly meshes with and is supported by three differential pinions associated with it so that each said side gear is floatingly mounted on said three differential pinions associated therewith.

7. The limited-slip differential of claim 5, wherein each of said differential pinions is rotatably mounted by means of a needle roller bearing in said differential case at least at one end thereof.

8. The limited-slip differential of claim 6, wherein each of said differential pinions is rotatably mounted by means of a needle roller bearing in said differential case at each end thereof.

* * * * *